United States Patent
McNally et al.

(10) Patent No.: US 12,002,985 B2
(45) Date of Patent: Jun. 4, 2024

(54) BATTERY CABINET WITH FLAME PROTECTION/MANAGEMENT CONSTRUCTION

(71) Applicant: Vertiv Corporation, Westerville, OH (US)

(72) Inventors: John McNally, Chicago, IL (US); Nicholas David Slee, Delaware, OH (US)

(73) Assignee: Vertiv Corporation, Westerville, OH (US)

( * ) Notice: Subject to any disclaimer, the term of this patent is extended or adjusted under 35 U.S.C. 154(b) by 442 days.

(21) Appl. No.: 17/398,662

(22) Filed: Aug. 10, 2021

(65) Prior Publication Data

US 2022/0052416 A1 Feb. 17, 2022

Related U.S. Application Data

(60) Provisional application No. 63/064,204, filed on Aug. 11, 2020.

(51) Int. Cl.
*H01M 50/30* (2021.01)
*H01M 50/209* (2021.01)
(Continued)

(52) U.S. Cl.
CPC ....... *H01M 50/394* (2021.01); *H01M 50/209* (2021.01); *H01M 50/251* (2021.01);
(Continued)

(58) Field of Classification Search
CPC ............. H01M 50/394; H01M 50/251; H01M 50/209; H01M 50/383; H01M 2220/10; H01M 2200/00
See application file for complete search history.

(56) References Cited

U.S. PATENT DOCUMENTS 5,004,129 A * 4/1991 Loch .................. H01M 50/227
206/703
5,806,948 A 9/1998 Rowan, Sr. et al.
(Continued)

FOREIGN PATENT DOCUMENTS

| EP | 1970981 A2 | 9/2008 |
| EP | 2187473 A1 | 5/2010 |
| KR | 20150113688 A * | 10/2015 |

OTHER PUBLICATIONS

International Search Report and Written Opinion regarding International Application No. PCT/US2021/045500, dated Nov. 25, 2021.

*Primary Examiner* — Matthew W Ing
(74) *Attorney, Agent, or Firm* — HARNESS, DICKEY & PIERCE, P.L.C.

(57) ABSTRACT

In one aspect the present disclosure relates to a battery cabinet apparatus having flame and noxious gas management capability. The apparatus has multiple, parallel arranged vertical frame elements, multiple spaced apart shelves disposed within an interior area of the apparatus, and multiple louver panels. The louver panels are arranged one above another and coupled to a first pair of the vertical frame elements. Each of the louver panels has an upper portion and a lower portion, where the lower portion angles inwardly relative to the interior area of the apparatus. In this manner the upper portion of a first one of the louver panels cooperates with the lower portion of a second one of the louver panels disposed immediately above the first one of the louver panels to form an opening. The opening enables exhausting at least one of flames or noxious gasses that develop within the apparatus.

20 Claims, 6 Drawing Sheets

(51) Int. Cl.
*H01M 50/251* (2021.01)
*H01M 50/383* (2021.01)

(52) U.S. Cl.
CPC ...... *H01M 50/383* (2021.01); *H01M 2200/00* (2013.01); *H01M 2220/10* (2013.01)

(56) References Cited

U.S. PATENT DOCUMENTS

| | | |
|---|---|---|
| 6,889,752 B2 | 5/2005 | Stoller |
| 2002/0136042 A1* | 9/2002 | Layden ............... H01M 50/284 363/146 |
| 2004/0007348 A1 | 1/2004 | Stoller |
| 2016/0233471 A1* | 8/2016 | Khandelwal ........ H01M 50/224 |
| 2017/0063052 A1 | 3/2017 | Johnson et al. |
| 2017/0358811 A1 | 12/2017 | Blackmore et al. |
| 2018/0077819 A1 | 3/2018 | Roy |
| 2019/0198834 A1 | 6/2019 | Maloney et al. |

* cited by examiner

BATTERY CABINET WITH FLAME PROTECTION/MANAGEMENT CONSTRUCTION

CROSS-REFERENCE TO RELATED APPLICATIONS

This application claims the benefit of U.S. Provisional Application No. 63/064,204, filed on Aug. 11, 2020. The entire disclosure of the above application is incorporated herein by reference.

FIELD

The present disclosure relates to equipment cabinets for electrical and electronic equipment, and more particularly to an equipment cabinet having a flame protection/management construction for limiting propagation of flame and noxious gases caused by one component at one shelf location of the cabinet to other shelf locations of the cabinet.

BACKGROUND

The statements in this section merely provide background information related to the present disclosure and may not constitute prior art.

Present day fire codes in most jurisdictions are increasingly including a standard for testing fire performance of lithium ion batteries when such batteries are used in equipment cabinets in present day data centers and other wide area network equipment sites. Such batteries are becoming increasingly popular in connection with uninterruptible power sources or supplies (UPSs), as the type of battery used with many present day UPSs. In the United States, specific standards are set forth by Underwriters Laboratories for the use of lithium ion batteries in UPS equipment cabinets.

Such equipment cabinets that are used to hold the lithium batteries often hold one or more battery cells on a plurality of elevationally arranged shelves within the cabinet, one battery above another. Accordingly, if one battery cell should catch fire, it is critical that the flame propagating upwardly from it, as well as the hot gases released from the damaged battery, not be allowed to quickly ignite the battery cell(s) on any of the shelf locations above it, or otherwise present a high risk of an explosion within the cabinet. Thus, it is of paramount importance to quickly direct out from the cabinet the flame and noxious gases created by one battery cell (or battery cell string) that catches fire, in order to prevent, or at least to substantially inhibit, the spread of the fire to batteries on other shelf locations within the same cabinet. In view of the relatively tight constraints imposed with present day equipment cabinets, this has proved to be a challenging issue.

SUMMARY

This section provides a general summary of the disclosure, and is not a comprehensive disclosure of its full scope or all of its features.

In one aspect the present disclosure relates to a battery cabinet apparatus having flame and noxious gas management capability. The apparatus may comprise a plurality of parallel arranged vertical frame elements, a plurality of spaced apart shelves disposed within an interior area of the apparatus, and a plurality of louver panels. The louver panels may be arranged one above another and coupled to a first pair of the vertical frame elements. Each of the louver panels may include an upper portion and a lower portion. The lower portion is disposed below the upper portion, and angles inwardly, relative to the interior area of the apparatus. In this manner, the upper portion of a first one of the louver panels cooperates with the lower portion of a second one of said louver panels disposed immediately above the first one of the louver panels to form an opening for exhausting at least one of flames or noxious gasses that develop within the apparatus.

In another aspect the present disclosure relates to a battery cabinet apparatus having flame and noxious gas management capability. The apparatus may comprise a plurality of parallel arranged vertical frame elements, a plurality of spaced apart shelves disposed within an interior area of the apparatus, and first and second pluralities of louver panels. Ones of the first plurality of louver panels may be arranged one above another and coupled to a first pair of the vertical frame elements on a first side of the apparatus. Ones of the second plurality of louver panels may be arranged one above another and coupled to a second pair of the vertical frame elements on a second side of the apparatus opposite the first side. Each one of the first and second pluralities of louver panels may include an upper portion and a lower portion disposed below the upper portion, which angles inwardly, relative to the interior area of the apparatus. The upper and lower portions of vertically adjacent ones of the louver panels cooperate to form openings for exhausting at least one of flames or noxious gasses that develop within the apparatus. A top panel may be included which is operatively supported by upper ends of the vertical frame elements, and which has a plurality of openings for assisting in exhausting at least one of the flames or noxious gasses out from the interior area of the apparatus. A plurality of side panels may also be included which are configured to cover the louver panels.

In still another aspect the present disclosure relates to a method for forming a battery cabinet having a flame and noxious gas management capability. The method may comprise arranging a plurality of vertical frame elements parallel to one another, and disposing a plurality of spaced apart shelves within an interior area of the apparatus. The method may also comprise arranging a plurality of louver panels one above another, and coupling the plurality of louver panels to a first pair of the vertical frame elements. The method may involve configuring each of the louver panels with an upper portion and a lower portion, wherein the lower portion angles inwardly, relative to the interior area of the apparatus. In this manner the upper portion of a first one of the louver panels cooperates with the lower portion of a second one of said louver panels disposed immediately above the first one of the louver panels to form an opening for exhausting at least one of flames or noxious gasses that develop within the apparatus.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
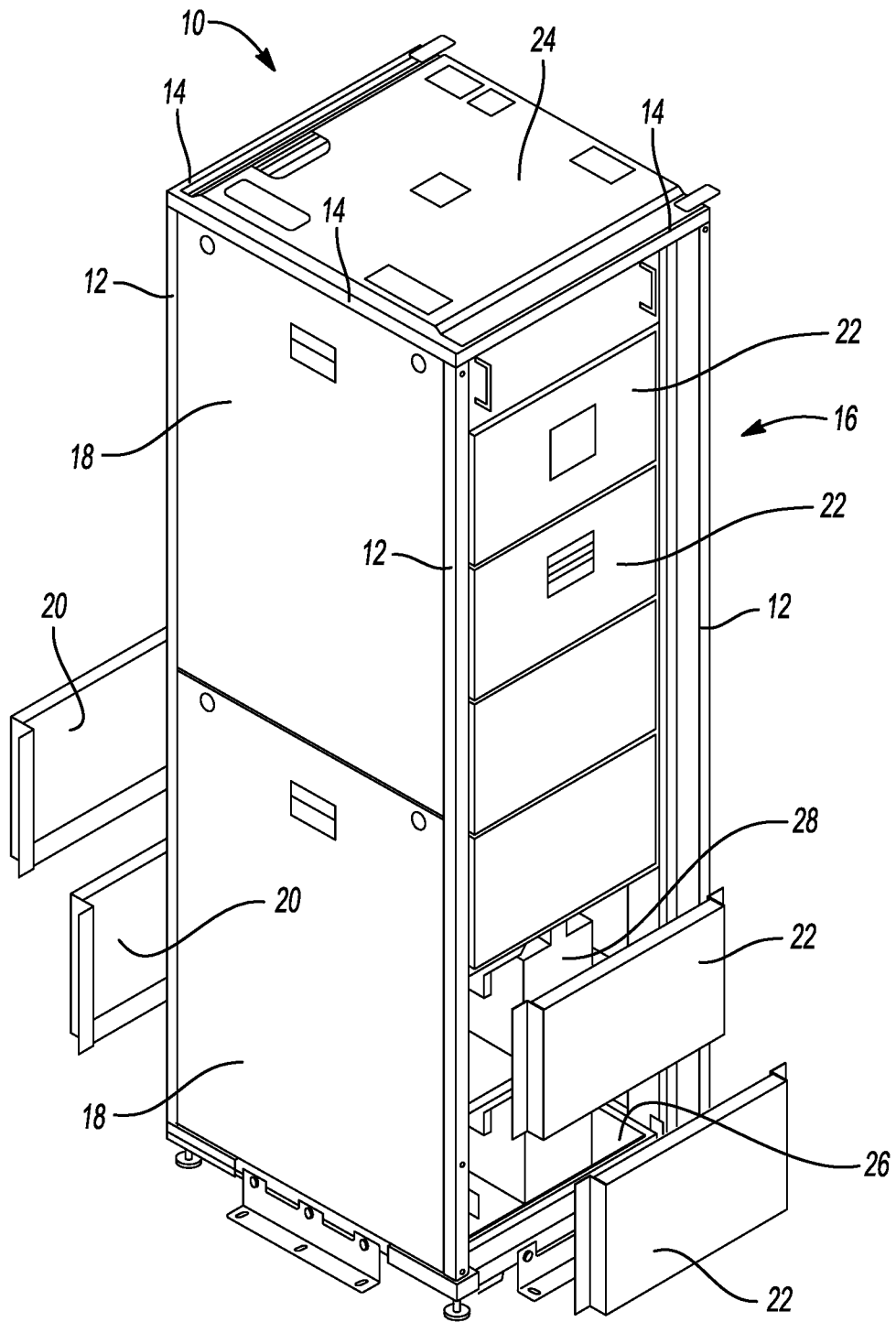
FIG. 1 is a front/left side perspective view of one embodiment of an equipment cabinet in accordance with the present disclosure.
Figure 2:
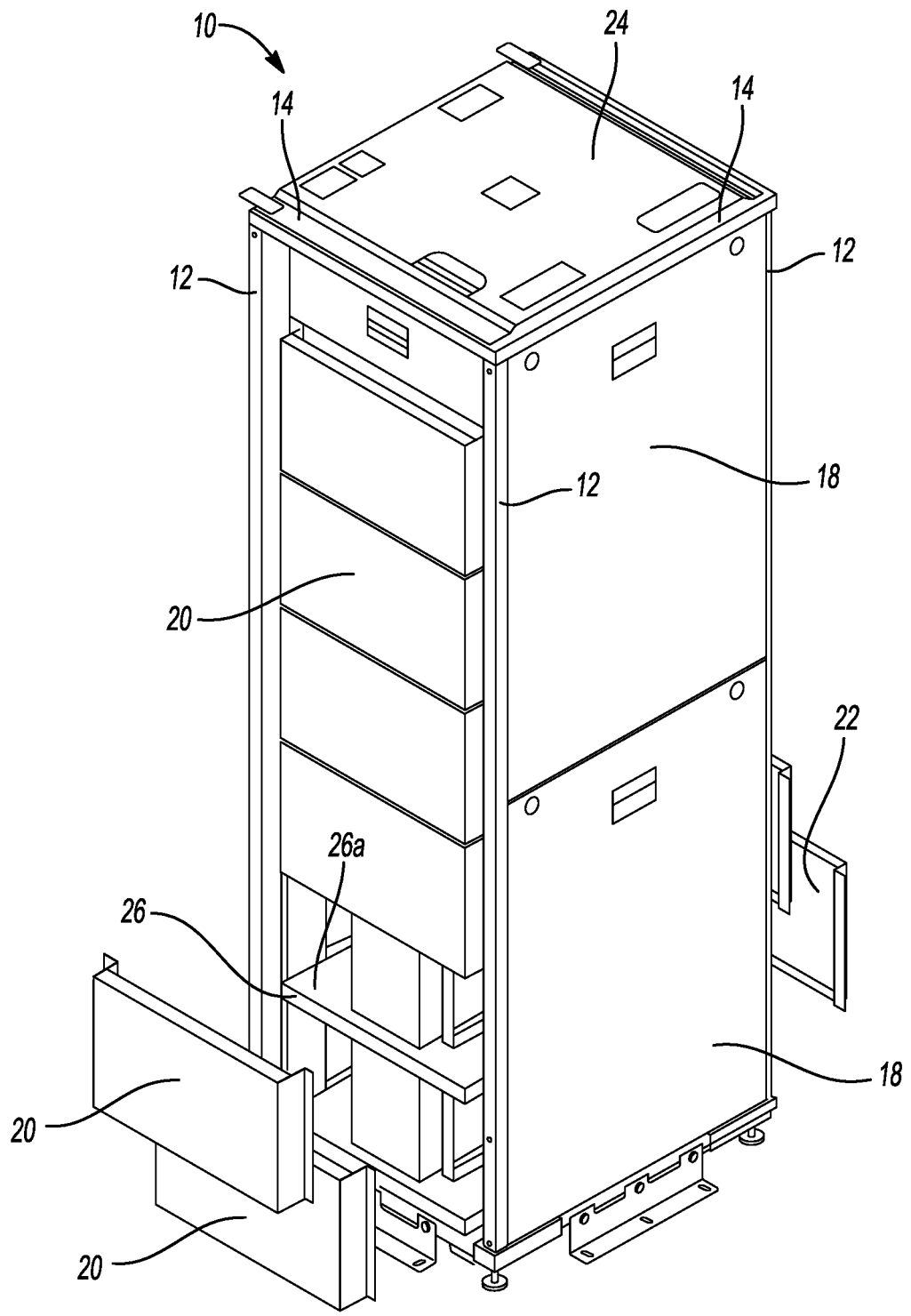
FIG. 2 is a rear/right side perspective view of the cabinet of FIG. 1.

Referring to FIGS. 1 and 2 there is shown an equipment cabinet 10 (hereinafter simply "cabinet 10") in accordance with one embodiment of the present disclosure. The cabinet 10 includes a plurality of four vertically arranged frame elements 12 coupled to a plurality of four upper horizontally arranged frame elements 14 to form a frame-like structure 16 to which a plurality of removable panels may be coupled. The removable panels include a plurality of removable exterior side panels 18, removable rear panels 20, and removable front panels 22. A top panel 24 may be secured to the horizontal frame elements 14 at the top portion of the frame-like structure 16. The exterior panels 18-24 may be secured via threaded screws (not shown) or any other type of suitable fasteners. Internally, a plurality of spaced apart shelves 26 are supported by horizontal members (not shown) attached to and extending between the vertical frame elements 12. The shelves 26 each define a corresponding shelf location on which a battery cell 28 or battery string (i.e., collection of battery cells) may be supported. In the present example the cabinet 10 is used to support lithium ion battery cells and battery cell strings, although essentially any form of battery could be housed within the cabinet 10. Merely for convenience, the following discussion will refer to the battery cells 28 or battery strings simply as "battery" or "batteries" 28.

Preferably, a layer of intumescent material may be disposed on an upper surface of each shelf 26 upon which the battery cell 28 rests. Optionally, an additional layer of intumescent material may be secured to a lower surface 26a of each shelf 26. The intumescent material may be, in one example, INTUPLAS® intumescent thermoplastic available from Pyrophobic Systems, Ltd., or in another example may be 3M Fire Barrier Composite Sheet CS-195+, or still further may be any other intumescent material which is suitable for use as a heat insulating and fire retardant layer.

Figure 3:
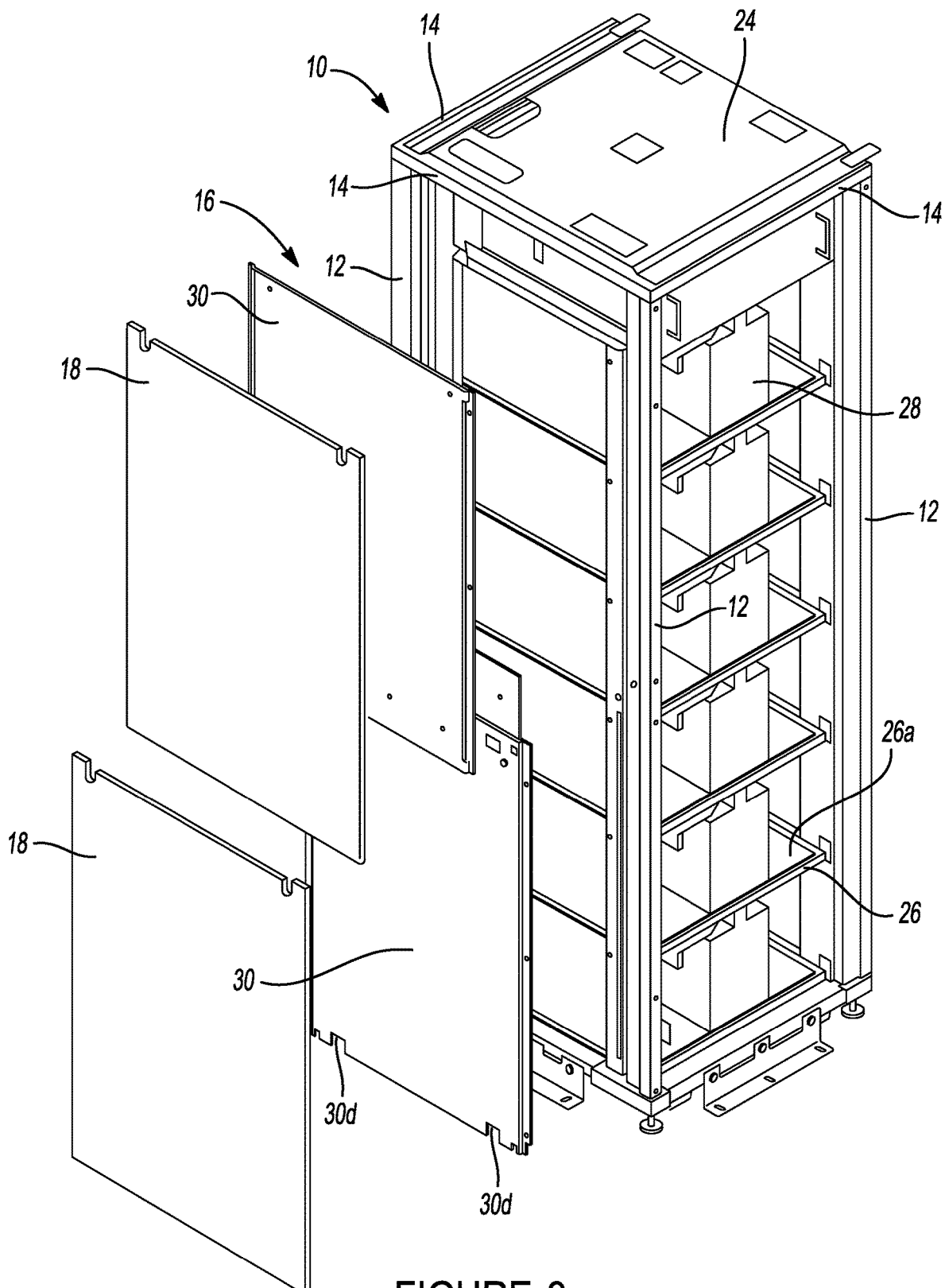
FIG. 3 is an exploded perspective view of a portion of the cabinet of FIG. 1 showing the exterior and intermediary side panels, as well as the louver panels, on one side of the cabinet.
Figure 4:
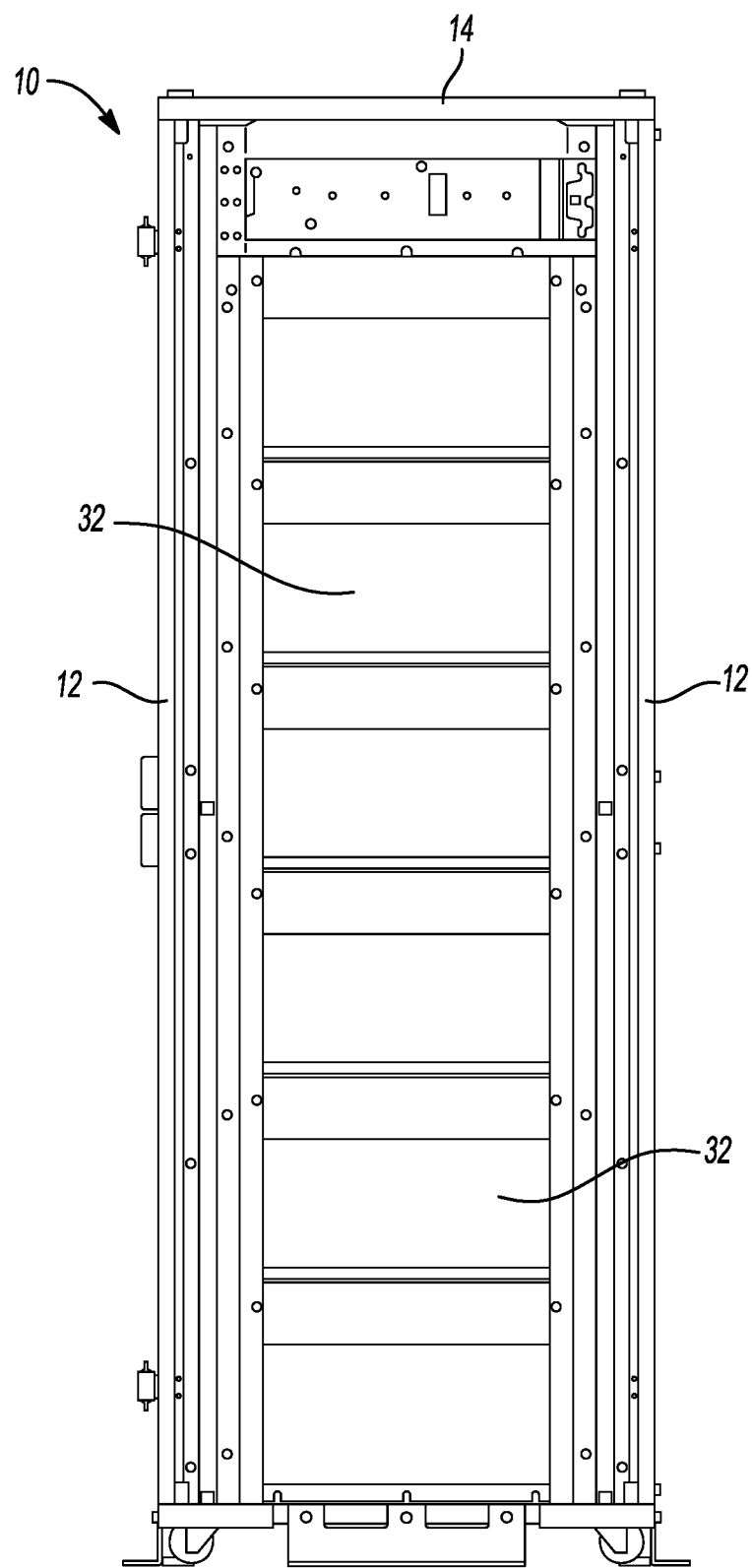
FIG. 4 is a side view of the cabinet of FIG. 3 but without the exterior and intermediary panels, clearly illustrating the louver panels.
Figure 5:
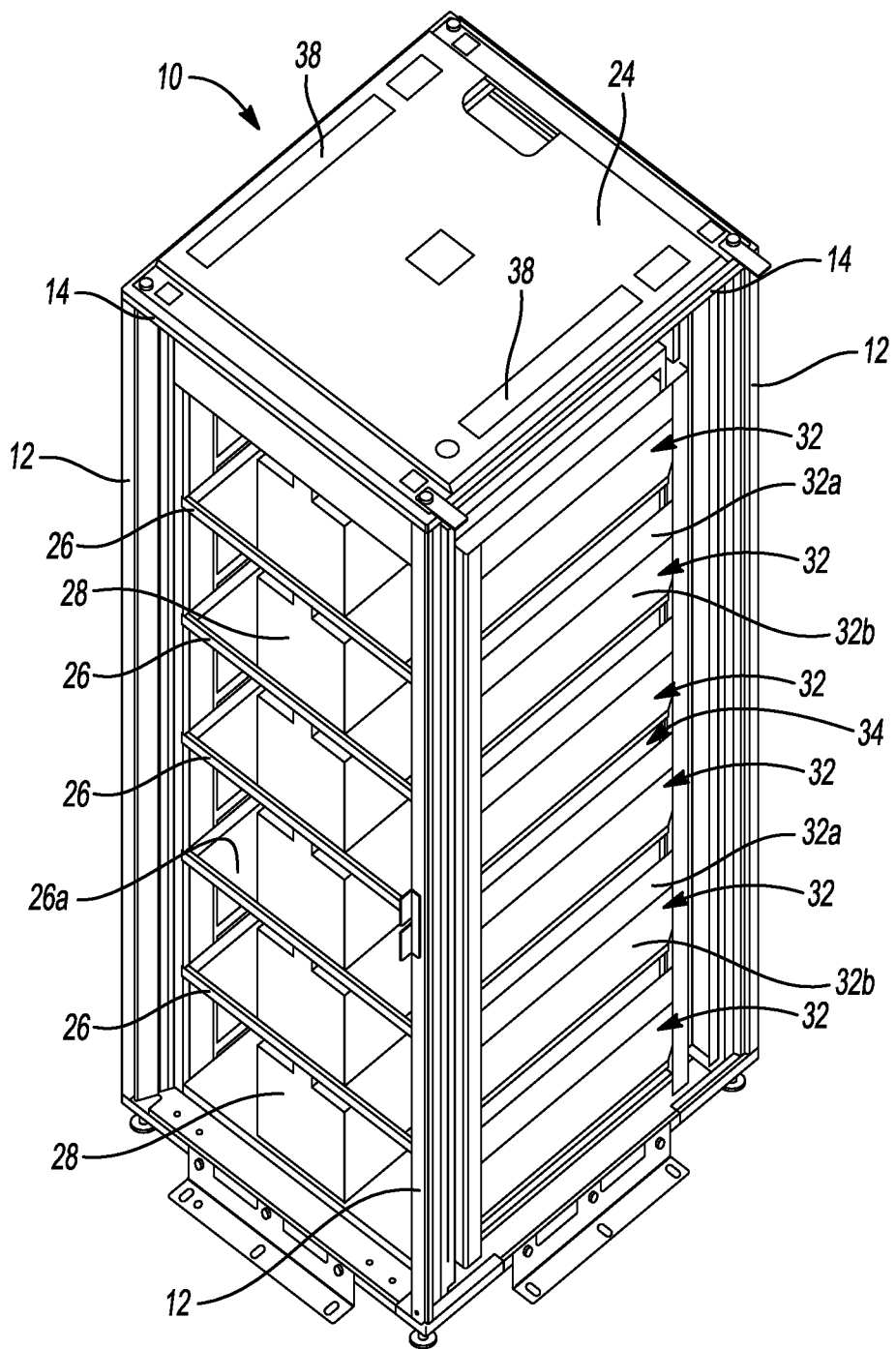
FIG. 5 is a top perspective view of the cabinet of FIG. 1 illustrating the elongated openings formed at the upper end of each louver panel.
Figure 6:
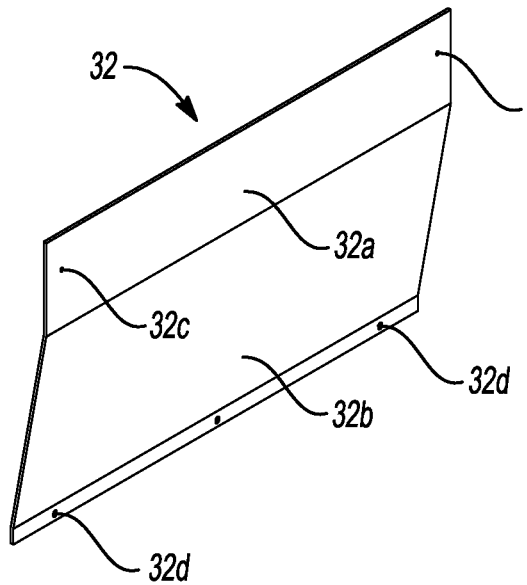
FIG. 6 is a perspective view of one of the louver panels.

FIGS. 3 and 4 further illustrate that the cabinet 10 includes intermediary side panels 30 and louver panels 32 located on opposing sides of the cabinet 10. FIG. 5 shows the louver panels 32 more clearly along one side of the cabinet 10, and FIG. 6 shows one louver panel 32 in greater detail. With reference to FIG. 6, each louver panel 32 includes an upper portion 32a and a lower portion 32b. The lower portion 32b is angled to project inwardly when the upper portion is secured at locations 32c via rivets (or possibly via threaded fasteners) to a pair of the vertical frame elements 12. The lower portion 32b includes openings 32d which enable rivets (or possibly threaded fasteners) to be used to secure the louver panel to horizontal members (not shown) extending between a selected pair of the vertical frame elements 12. As noted in FIG. 5, the angling of the lower portion 32b relative to the upper portion 32a enables the upper portion 32a of each louver panel 32 to form an elongated opening 34 in cooperation with the lower portion 32b of the louver panel 32 immediately above it. This is an important feature of the cabinet 10, as the elongated openings 34 form vent areas through which flames and noxious gases that develop from a battery 28 that has caught fire, or is about to catch fire, can exit the space between the shelves 26 above and below the battery 28. Upon exiting the elongated opening 34, the flames and noxious gases can be channeled vertically upward within the space formed between the louver panels 32 and the intermediary side panels 30, to be discharged through perforations 38 in the top panel 14, as further discussed below. Thus, the louver panels 32 provide a means for preventing, or at least substantially inhibiting, flames and noxious gases from rising and directly heating or engulfing the battery 28 on the shelf 26 directly above the damaged battery. This controlled, vertical channeling of the flames and noxious gases out from the cabinet 10 can provide valuable time in responding to a fire condition, and can help prevent the entire cabinet 10 and all of the other still-operating batteries 28 supported therein from being quickly enveloped in flames. The elongated openings 34 also provide the valuable benefit that the noxious gases created as a battery catches fire can be quickly channeled out from the cabinet 10, thus significantly reducing the chance of an explosion occurring within the cabinet 10.

Figure 7:
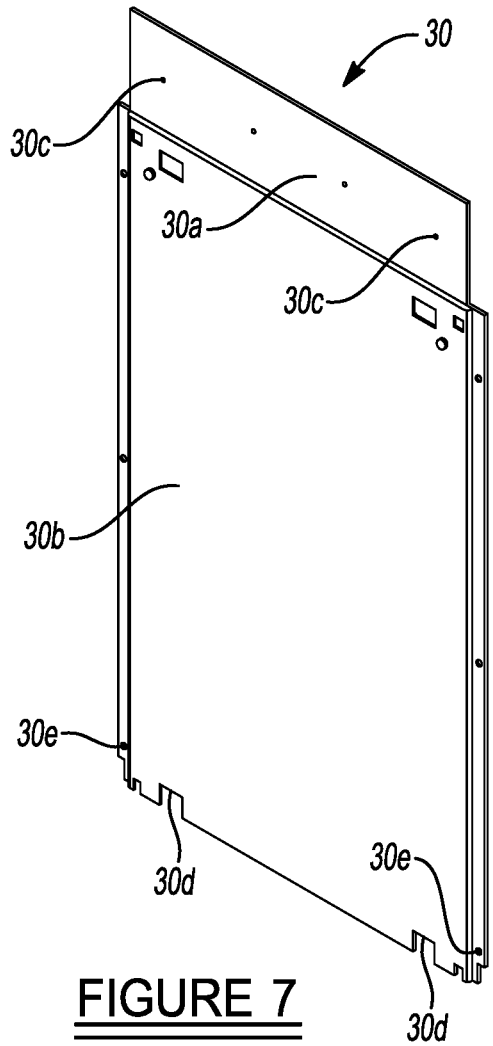
FIG. 7 is a perspective view of one of the intermediary side panels of the cabinet of FIG. 3.

With further reference to FIG. 7, one of the intermediary side panels 30 is shown in greater detail. The intermediary side panel 30 includes an upper portion 30a and a lower portion 30b. Upper portion 30a includes openings 30c enabling the intermediary side panel 30 to be coupled to another immediately vertically adjacent intermediary side panel 30. Notches 30d help to enable alignment of the intermediary side panel 30 to the exterior side panels 18 by means of tabs (not shown) on the exterior side panels that slide into the notches. Optionally, layers of intumescent material may also be included on one or both opposing surfaces of the intermediary side panels 30, or possibly even on the inside surface of the exterior side panels 18, to further help reduce heat propagation to adjacently located equipment cabinets. The lower portion 30b of the intermediary side panel also includes openings 30e which enable external threaded fasteners to be used to secure the lower portion 30b to a selected pair of the vertical frame elements 12. The intermediary side panels 30 also help to prevent flames and noxious gases from escaping laterally out from the sides of the cabinet 10 and possibly damaging other adjacently positioned cabinets and/or equipment.

Figure 8:
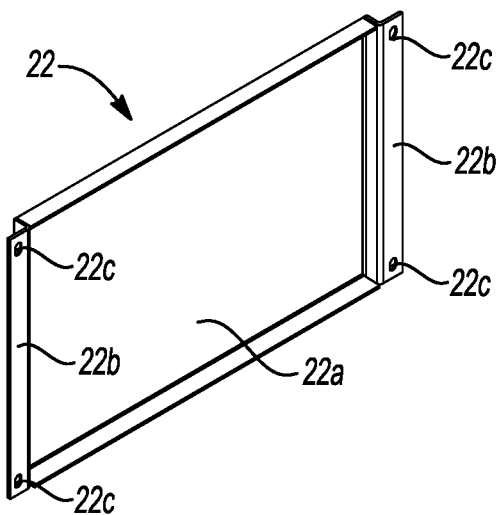
FIG. 8 is a perspective view of one of the removable front panels.
Figure 9:
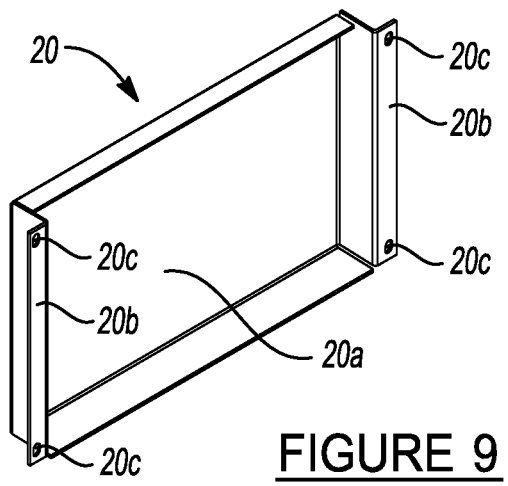
FIG. 9 is a perspective view of one of the removable rear panels.

FIGS. 8 and 9 show perspective views of the removable front panel 22 and the removable rear panel 20, respectively. The front and rear panels 22 and 20 help to prevent any flames and/or noxious gases from escaping out the front or rear areas, respectively, of the cabinet 10 during a fire event. In FIG. 8, opposing flanges 22b on the front panel 22 extend out from a planar main body portion 22a and include holes 22c for enabling attachment to a front pair of the vertical frame elements 12 via threaded fasteners. Removable rear panel 20 similarly includes a main body portion 20a with flanges 20b having holes 20c. The holes 20c enable attachment of the removable rear panel 20 to a rear pair of the vertical frame elements 12. Collectively, the contiguously vertically positioned front panels 22 form a continuous wall along a front side of the cabinet 10, while the contiguously positioned rear panels 20 form a continuous wall along the rear side of the cabinet.

Referring further to FIG. 5, the top panel 24 can also be seen in greater detail. The top panel 24 is removably secured via conventional threaded fasteners (not shown) to the horizontal frame elements 14. The top panel 24 includes a plurality of perforated areas or regions 38 which allow any flames and gases that have been channeled via the elongated openings 34 vertically upward through the space formed between the louver panels 32 and the intermediary side panels 30 to be vented out of the cabinet 10. The perforated regions 38 in the illustration of FIG. 5 are preferably dimensioned to match the length and width of the elongated openings 34.

The various panels of the cabinet 10 may be formed from carbon steel, aluminum or any other suitably strong, generally fire resistant materials. However, it is anticipated that carbon steel will be an especially popular material for construction of the various panels of the cabinet, in view of its structural strength, relatively light weight, durability and ability to provide a relatively good degree of fire and heat resistance.

The cabinet 10 of the present disclosure provides the significant advantage of helping to direct flames and noxious gases out of the cabinet if a fire should develop from any one of the batteries 28. Importantly, the louver panels 32 do not tangibly increase the overall footprint of the cabinet 10 or otherwise interfere with shelf locations in the cabinet, or otherwise tangibly increase the overall cost of construction of the cabinet, its weight or complexity of construction. Regardless of which shelf location a fire develops in, the louver panels 32 and the intermediary side panels 30 help to protect the shelf location (and battery) immediately above the affected battery 28, as well as to protect other equipment cabinets disposed closely adjacent the cabinet 10. This provides valuable time to respond to an emergency condition and helps to prevent, or at least to substantially inhibit, damage to other batteries and components located within the equipment cabinet above the affected shelf location that could exacerbate an emergency condition. The excellent flame control also potentially enables equipment cabinets including the construction described herein to be located closer to one another than would ordinarily be possible with a conventional equipment cabinet construction. This can help to make more efficient use of the floor space available in a given room.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A battery cabinet apparatus having flame and noxious gas management capability, the apparatus comprising:
 a plurality of parallel arranged vertical frame elements;
 a plurality of spaced apart shelves disposed within an interior area of the apparatus;
 a plurality of louver panels arranged one above another and coupled to a first pair of the vertical frame elements;
 each of the louver panels including:
  an upper portion having an upper edge; and
  a lower portion disposed below the upper portion and having a lower edge, with the lower portion being inward of the upper portion and angled inwardly relative to the interior area of the apparatus, such that the upper edge of the upper portion of a first one of the louver panels cooperates with the lower edge of the lower portion of a second one of said louver panels disposed immediately above the first one of the louver panels to form a permanent, elongated opening extending between the first pair of vertical frame elements, for exhausting at least one of flames or noxious gasses that develop within the apparatus.

2. The apparatus of claim 1, wherein the upper portions and lower portions of the plurality of louver panels cooperate to form a plurality of elongated, spaced apart openings arranged one above another, for venting at least one of flames or noxious gasses.

3. The apparatus of claim 1, wherein the plurality of louver panels are arranged on one side of the apparatus.

4. The apparatus of claim 3, wherein upper portions of the louver panels are coupled to the pair of vertical frame elements.

5. The apparatus of claim 1, further comprising an additional plurality of louver panels secured coupled to a second pair of the plurality of vertical frame elements, and arranged vertically one above another, each of the additional plurality of louver panels including:
 an upper portion; and
 a lower portion which angles inwardly, relative to the interior area of the apparatus, such that vertically adjacent pairs of the additional of louver panels form a plurality of vertically spaced apart openings for exhausting at least one of flames or noxious gasses.

6. The apparatus of claim 5, wherein the additional plurality of louver panels are arranged on a side of the apparatus opposite and parallel to the plurality of louver panels.

7. The apparatus of claim 5, wherein:
 each one of the plurality of louver panels includes a plurality of first openings for securing the louver panels to the first pair of vertical frame elements using a first plurality of independent fastening elements; and
 each one of the additional plurality of louver panels includes a plurality of second openings for securing the additional plurality of louver panels to the second pair of vertical frame elements.

8. The apparatus of claim 5, further comprising:
 a first plurality of intermediary panels disposed adjacent and parallel to the plurality of louver panels to form a first space therebetween for channeling the at least one of flames or noxious gasses upwardly toward an upper area of the apparatus; and
 a second plurality of intermediary panels disposed adjacent and parallel to the additional plurality of louver panels for forming a second space therebetween for channeling the at least one of flames or noxious gasses upwardly toward the upper area of the apparatus.

9. The apparatus of claim 8, wherein each one of said first and second pluralities of intermediary side panels includes an upper portion and a lower portion, each said upper portion of each said intermediary side panel assisting in enabling coupling to the lower portion of one of the intermediary side panels.

10. The apparatus of claim 8, further comprising a first plurality of removable exterior side panels securable over the first plurality of intermediary panels.

11. The apparatus of claim 8, further comprising a second plurality of removable exterior side panels securable over the second plurality of intermediary panels.

12. The apparatus of claim 1, wherein each one of the plurality of louver panels includes a plurality of openings for receiving independent fastening elements to secure the plurality of louver panels to the first pair of vertical frame elements.

13. The apparatus of claim 1, further comprising:
 a top panel extending perpendicularly relative to the plurality of vertical frame elements and operatively supported by the plurality of vertical frame elements to cover an upper area of the apparatus, the top panel including a plurality of openings for exhausting at least one of flames or noxious gasses from the interior area of the apparatus.

14. The apparatus of claim 13, further comprising:
 a plurality of horizontal frame elements coupled to the plurality of vertical frame elements; and
 the top panel being secured to the plurality of horizontal frame elements.

15. The apparatus of claim 1, further comprising at least one intermediary side panel positioned parallel and adjacent to the plurality of louver panels to form a space therebetween for assisting in channeling the at least one of flames or noxious gasses upwardly towards an upper area of the apparatus.

16. The apparatus of claim 1, further comprising a removable front panel disposed over a front area of the apparatus, extending perpendicularly to the plurality of louver panels.

17. A battery cabinet apparatus having flame and noxious gas management capability, the apparatus comprising:
 a plurality of parallel arranged vertical frame elements;
 a plurality of spaced apart shelves disposed within an interior area of the apparatus;
 a first plurality of louver panels arranged one above another and coupled to a first pair of the vertical frame elements on a first side of the apparatus;
 a second plurality of louver panels arranged one above another and coupled to a second pair of the vertical frame elements on a second side of the apparatus opposite the first side;
 each one of the first and second pluralities of louver panels including:
  an upper portion having an upper edge;
  a lower portion disposed below the upper portion and having a lower edge, the lower portion being inward of the upper portion and angled inwardly relative to the interior area of the apparatus;
  the upper and lower edges of the upper and lower portions, respectively, of vertically adjacent ones of the louver panels cooperating to form permanent, elongated openings extending for exhausting at least one of flames or noxious gasses that develop within the apparatus;

a top panel operatively supported by upper ends of the vertical frame elements and having a plurality of openings for assisting in exhausting at least one of the flames or noxious gasses out from the interior area of the apparatus; and side panels configured to cover the louver panels.

18. The apparatus of claim 17, wherein:

the side panels comprise a first plurality of intermediary side panels for covering the first plurality of louver panels;

the side panels comprise a second plurality of intermediary side panels for covering the second plurality of louver panels; and wherein the first and second pluralities of intermediary side panels help to form spaces between their respective first or second pluralities of louver panels to help channel the at least one of flames or noxious gasses upwardly towards an upper end of the apparatus.

19. The apparatus of claim 18, further comprising:

a first plurality of removable exterior side panels for covering the first plurality of intermediary side panels; and a second plurality of removable exterior side panels for covering the second plurality of intermediary side panels.

20. A method for forming a battery cabinet having a flame and noxious gas management capability, the method comprising:

arranging a plurality of vertical frame elements parallel to one another;

disposing a plurality of spaced apart shelves within an interior area of the apparatus;

arranging a plurality of louver panels one above another, and coupling the plurality of louver panels to a first pair of the vertical frame elements; and configuring each of the louver panels with an upper portion having an upper edge and a lower portion having a lower edge, wherein the lower portion is inward of the upper portion and angles inwardly, relative to the interior area of the apparatus, such that the upper edge of the upper portion of a first one of the louver panels cooperates with the lower edge of the lower portion of a second one of said louver panels disposed immediately above the first one of the louver panels to form a permanent, elongated opening for exhausting at least one of flames or noxious gasses that develop within the apparatus.

* * * * *